Jan. 25, 1966 E. C. LOUSTAUNAU 3,231,293
WHEEL CHAIR ATTACHMENTS
Filed June 1, 1964
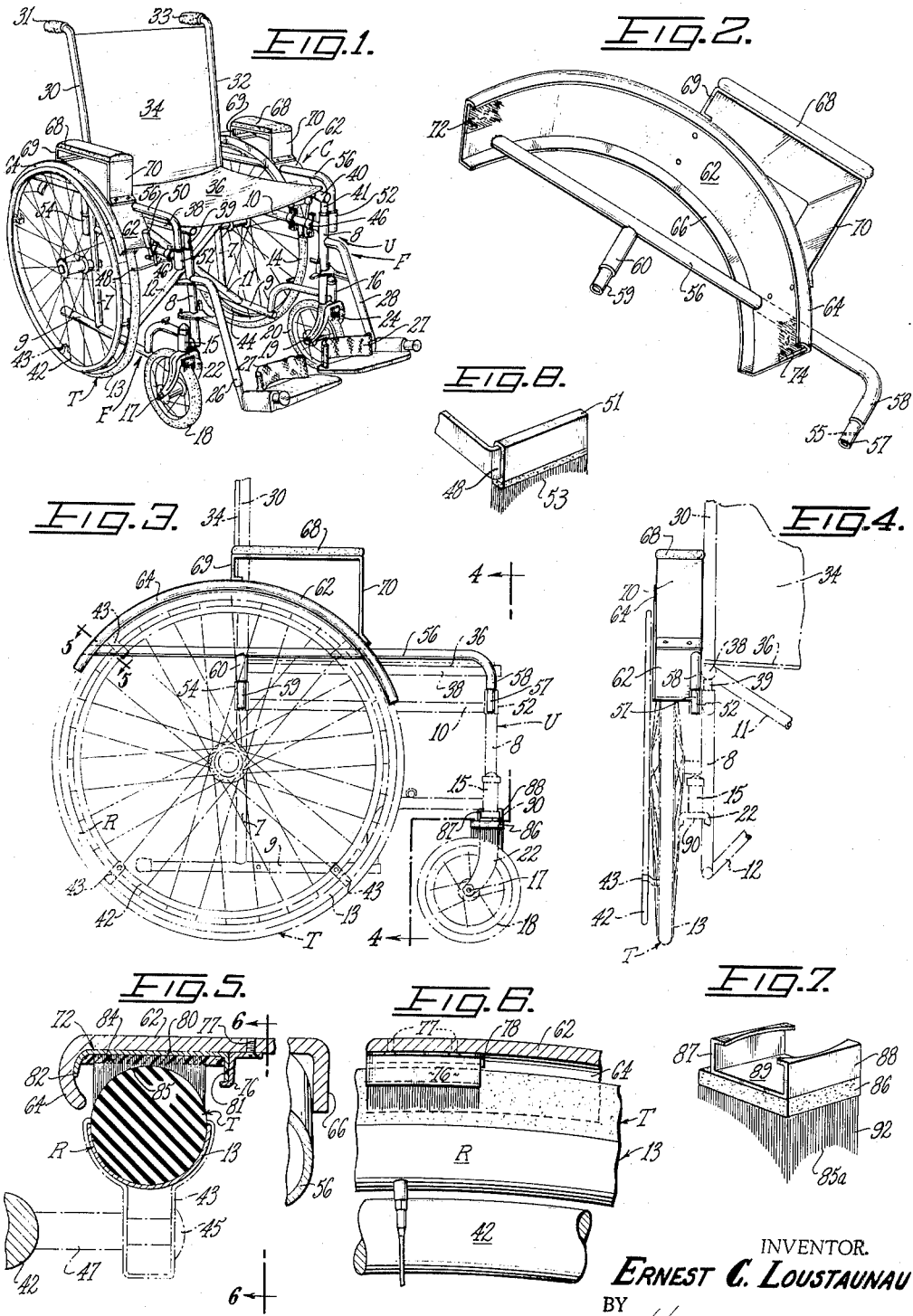
INVENTOR.
ERNEST C. LOUSTAUNAU
BY
Howard L. Johnson
ATTORNEY

United States Patent Office 3,231,293
Patented Jan. 25, 1966

3,231,293
WHEEL CHAIR ATTACHMENTS
Ernest C. Loustaunau, 8551 Stewart and Gray Road,
Downey, Calif.
Filed June 1, 1964, Ser. No. 371,525
7 Claims. (Cl. 280—211)

This invention relates to wheel chairs having new and beneficial attachments, and to such attachments (which may be separate articles of commerce) which are particularly adapted to protect a wheel chair occupant against becoming soiled (on his hands or clothing) by contact with dirt from any of the wheels but especially from the large side wheels which may inadvertently rub against his clothing and thus transfer damaging material thereto. Foreign material picked up by the tires outside the home is likewise transferred to internal floor covering, draperies, etc., if not promptly removed. Thus the invention provides means for cleaning such tires after the wheel chair has passed through a stretch of muddy, rainy or otherwise dirty surface or runway, and has then entered a cleaner area such as within a building or other enclosure.

The present wiping units may either be of the brush or scraper type, or alternately be formed of removable and readily disposable batting or pieces of somewhat spongy or absorbent material which can be discarded like paper towling as soon as a particular cleaning task is effected. However, the present wiper units are especially characterized by having a grooved, contact surface, curved at least approximately, to fit the tread face or curvature of the tire in two directions (laterally and circumferentially) so that the face of the contacted tire is automatically cleaned by action of its own rotation against the wiper when the latter is relatively lightly pressed thereagainst. In addition there is provided a tire guard (independent of the wiper units) which may be substituted for conventional, detachable armrests on present wheel chairs.

Other objects and advantages will become apparent as the description proceeds, having reference to the accompanying drawings which illustrate presently preferred embodiments wherein FIGURE 1 is a perspective view of a wheel chair with my attachments mounted thereon;

FIGURE 2 is a perspective view from beneath, of one of my detachable wheel guard and armrest assemblies by itself;

FIGURE 3 is a side elevational view of the side frame and adjoining structures of the wheel chair;

FIGURE 4 is a fragmental elevational end view of one side of the chair as viewed along line 4—4 of FIGURE 3;

FIGURE 5 is a transverse sectional view taken through one large side wheel and adjacent structures along the line 5—5 of FIGURE 3;

FIGURE 6 is a fragmental sectional view through the guard along the line 6—6 of FIGURE 5;

FIGURE 7 is a perspective view of the wiper member which is mounted above the caster type wheels; and FIGURE 8 is a perspective view of the sleeve- type wiper mounted on the brake shoe of the large wheel.

The illustrated wheel chair C conveniently may be of the type having an undercarriage or chassis U constructed of tubular members so as to impart both the required structural strength and light weight combined. It may also be laterally collapsible so as to facilitate its storage in small space, or its ready transportation folded within an automobile, etc. Some available models are also motor driven (not shown).

Characteristically the chassis U comprises a generally upright frame or bracing structure F along each side of the chair, being typically formed of upright 7, 8 and horizontal 9, 10 tubular members joined together in a generally rectangular configuration. The two side frames are coupled together by cross braces 11, 12. Each side frame F journals the respective large wheel 13, 14 and at its forward end provides a downward-opening, vertically disposed, pivot socket 15, 16 to mount the swivelling or caster-type small wheels 18, 20. Each forward wheel 18, 20 is carried on a horizontal axle 17, 19 which is retained in an inverted U-shaped yoke 22, 24.

A foot or leg support unit 26, 28 may be attached to each frame upright 8 and carry heelstraps 27, or other attachments. Upward extending, rear members 30, 32 of each side frame F jointly support a transverse back rest 34, at the top each backing tube 30, 32 being curved rearward, generally horizontally and parallel to form hand grips 31, 33. A seating member 36 is extended transversely between the laterally-separated upright side frames F, by attachment to edge supports 38, 40 which are secured to their respective frame F as by tubular insert studs 39, 41. Each large wheel 13, 14 desirably is provided with a hand rim 42, 44 for ease of manipulation of the wheel by the occupant of the chair, being secured to the rim R by brackets 43, pins 45, and collars 47 (FIG. 5).

The forward length of each upper frame arm 10 carries a brake assembly consisting of an attachment clamp means 46, a blunt-edge blade like brake-shoe 48 disposed to transversely abut the periphery of the tire T in binding engagement when pressed thereagainst, and a manual operating lever or handle 50 connected to the brake 48 through intermediate linkage or leverage means. The same upper frame arm 10 is provided with a pair of upward-opening, generally cylindrical, insert-sockets, 52, 54 adjacent its opposite ends.

There is provided a combination wheel guard and armrest (FIG. 2) for each side frame F, being formed with a horizontally disposable, (solid or tubular) anchor rod 56 turned down at the forward end 58 and with a parallel, dependent stud 60 located intermediate along the length of the rod, each of which dependent extensions bears a circumferentially restricted neck or insert plug 57, 59 for thrust reception in the corresponding socket 52, 54 of the frame F. When thus located, each anchor rod 56 is spaced laterally inward a short distance from the adjacent wheel 13 or 14 and disposed closely alongside the edge of the seat 36 (that is, generally parallel to the seat supports 38 or 40). Fixedly secured (as by welding) to the anchor rod 56 is an arcuate shaped shield or guard 62, transversely overlying and correspondingly curved to the circumference of the tire T, and spaced a short distance thereabove with its outer edge curved downward to form an overlying lip 64. Along the parallel, inner edge of the guard, a dependent, generally vertical wall 66 provides a possible lateral abutment or baffle for the occupant seated in the chair; if desired, it can be extended down to the level of the seat 36.

A more-or-less flattop armrest 68 (padded or cushioned as desired) is located atop the convex face of the guard 62 by means of upstanding support brackets at opposite ends 69, 70. If preferred, such armrest can be omitted, or alternately it can extend further forward along the whole length of the rod 56. In any event, it will be seen that temporary removal of the guard sturcture of FIG. 2 from either side of the chair C will enable the occupant to swing his legs to the floor so as to stand or slide off the seat from a forward corner thereof. When the guard assembly is replaced on the frame F, it is locked in place by a pin inserted jointly through the aligned angular openings 55 in the plug 57 and it surrounding socket 52.

The several tire-wiper members of the invention are as follows: A sleeve 51, open at one end is formed with an internal, longitudinal cavity or socket (generally rectangular in transverse section), for relatively snug, slip-fit, lengthwise mounting over the blade-shaped brake-shoe 48, thereby to enable its concave wiping or contact face 53 to be pressed (with less than braking force) against a (wet or soiled) tire T. At each end of the guard 62, its concave underface is provided with slide retention socket means 74 for selectively holding a wiper 72, 74 against the tire T. Such means comprise a Z-shaped, angle iron or rail 76 secured lengthwise beneath the guard as by rivets or screws 77 (FIGS. 5–6), with a transverse abutment 78 across the inner end. A wiper 72 or 74 consisting of a substantially flat, backing plate 80 has one side turned down at 81 for edgewise sliding abutment with the rail 76, and its opposite side 82 curved downward to loosely register with the concave face of lip 64.

Dependent from the underface of the backing plate 80 is a wiper element 84 which may be formed as the illustrated brush or bristles, which have their contact ends or face curved both laterally and longitudinally so as to form a general trough 85 which thus provides wide surface contact with the face of the tire T when the latter is rotated thereagainst. Instead of bristles, the shaped, wiping element 84 can be of felt, cellulose, cotton, synthetic plastic including sponge nylon, or other semi-absorbent and relatively form-retaining material. Such wiper 72, 74 can be withdrawn and replaced from time to time as the wiping surface 84 becomes soiled and/or worn, and especially after the chair has passed through mud clay or other material which wets or clings to the tires.

A similar, detachable wiper is provided for coupling to each yoke 22, 24 for cleaning the forward small wheels or casters 18, 20 (FIG. 7). It consists of a backing plate 86 bearing an opposing pair of resilient arms or jaws 87, 88 disposed to grasp the front and rear sides of the socket or pivot mount 15, 16 when the face 89 is held against the underface 90 of the yoke. As before, the wiper element 92 is shaped to correspond to the transversely arcuate and circumferential curvature of the tire of the caster 18, 20.

Various alternations and modifications will suggest themselves to those skilled in the art and it is not intended to limit myself to the precise details illustrated by way of example but it is my purpose to claim the invention broadly as hereinafter defined.

I claim:
1. For detachable connection to a wheel chair frame having a side wheel and an upward-opening pair of attachment sockets spaced therealong for mounting an armrest and the like:
   a combination armrest and wheel guard assembly comprising in combination,
   a longitudinal rod adapted to be disposed chordally and laterally spaced from the inner face of said wheel along the top thereof, said rod being formed with a pair of downward projecting, attachment stud means, spaced therealong in position for mounting in said attachment sockets of the frame, and
   an arcuate, downwardly concave guard which is secured near its respective ends to said rod adjacent a side edge of the guard which thus projects transversely therefrom so as to dispose the guard lengthwise closely overlying the upper curvature of the wheel when the attachment studs are mounted in said sockets, with a length of the mounted guard thus offering armrest support along its upper surface.
2. The assembly of the preceding claim 1 wherein selective retention means are disposed adjacent at least one end of the guard, and a tire-wiping member is carried by said retention means characterized by a generally arcuate, contact groove disposed to wipe the tread of said overlaid wheel, upon rotation of the latter against the tire-wiping member.

3. The assembly of the preceding claim 2 wherein said tire-wiping member comprises a brush.

4. The assembly of the preceding claim 2 wherein said tire-wiping member comprises a piece of semi-absorbant, realtively form-retaining material.

5. For detachable connection to a wheel chair frame having at least one caster-type wheel in a yoke-type mount, the improvement comprising:
   tire-wiping means for the caster-type wheel, which means includes a wiper-carrying backing plate insertable within the yoke-type mount of the caster to dispose said wiping means in functional contact with the tire, and resilient clamp jaw means disposed to engage said yoke-type mount, said clamp jaw means comprising a pair of jaws upstanding from opposite edges of said backing plate and provided with mutually-facing contact edges disposed to engage opposite sides of an upright pivot mount of said caster-type wheel above said yoke-type mount.

6. In combination with a wheel chair including a frame and a pair of large side wheels, at least one of said wheels having a manually-operable blade-type brake shoe and leverage means for selectively applying the brake shoe to the wheel with varying pressures, the improvement comprising:
   tire-wiping means including a sleeve manually removable by an occupant of the chair and formed with a longitudinal socket means adapted for relatively snug mounting over said blade-type brake shoe, said sleeve having an outer concave contact face thus disposed to be pressed wipingly against the tire upon gentle application of the brake.

7. A wheel chair including a frame and a pair of large side wheels located for manual manipulation by the occupant of the chair,
   an arcuate, downwardly concave guard carried by the frame lengthwise overhanging each of said side wheels and spaced radially outward a short distance for the perimeter thereof, the forward end of each guard being provided with longitudinal socket means for selective retention of a tire-wiping element therein, and
   tire-wiping means, manually disengageable from tire-contact by the occupant, and disposed in the respective socket means of the guard adjacent each of said wheels in position to clean the same upon rotation of the wheel thereagainst.

References Cited by the Examiner

UNITED STATES PATENTS

| | | | |
|---|---|---|---|
| 602,193 | 4/1898 | Neuert | 15—160 |
| 626,018 | 5/1899 | Dunlop | 280—158.1 |
| 719,608 | 2/1903 | Peterson. | |
| 767,242 | 8/1904 | Reichle. | |
| 914,390 | 3/1909 | Davis. | |
| 951,553 | 3/1910 | Williams | 16—41 |
| 998,744 | 7/1911 | Bonin | 15—176 |
| 1,337,173 | 4/1920 | White | 15—176 |
| 1,600,131 | 9/1926 | Overton | 280—242 |
| 2,681,689 | 6/1954 | Breed | 280—289 X |
| 2,832,085 | 4/1958 | Chamberlain | 15—160 X |

BENJAMIN HERSH, *Primary Examiner.*

LEO FRIAGLIA, *Examiner.*

W. A. MARCONTELL, *Assistant Examiner.*